(12) United States Patent
Sanborn et al.

(10) Patent No.: US 10,823,627 B2
(45) Date of Patent: Nov. 3, 2020

(54) SHAPE SENSING WITH MULTI-CORE FIBER SENSOR

(71) Applicant: Intuitive Surgical Operations, Inc., Sunnyvale, CA (US)

(72) Inventors: Eric E. Sanborn, Blacksburg, VA (US); Mark E. Froggatt, Blacksburg, VA (US); Dawn K. Gifford, Blacksburg, VA (US); Jeffrey T. LaCroix, Blacksburg, VA (US); Patrick Roye, Christiansburg, VA (US); Alexander K. Sang, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

(21) Appl. No.: 16/342,524

(22) PCT Filed: Oct. 20, 2017

(86) PCT No.: PCT/US2017/057626
§ 371 (c)(1),
(2) Date: Apr. 16, 2019

(87) PCT Pub. No.: WO2018/075911
PCT Pub. Date: Apr. 26, 2018

(65) Prior Publication Data
US 2019/0250050 A1    Aug. 15, 2019

Related U.S. Application Data

(60) Provisional application No. 62/449,389, filed on Jan. 23, 2017, provisional application No. 62/410,927, filed on Oct. 21, 2016.

(51) Int. Cl.
*G01L 1/24* (2006.01)
*G01B 11/16* (2006.01)
(Continued)

(52) U.S. Cl.
CPC ............ *G01L 1/246* (2013.01); *G01B 11/161* (2013.01); *G01B 11/165* (2013.01); *G01L 1/242* (2013.01);
(Continued)

(58) Field of Classification Search
CPC ............ G02B 6/02042; G02B 6/02076; G02B 6/022; G01L 1/242; G01L 1/246;
(Continued)

(56) References Cited

U.S. PATENT DOCUMENTS 7,772,541 B2 * 8/2010 Froggatt .............. G01M 11/083
250/226
7,781,724 B2   8/2010 Childers et al.
(Continued)

FOREIGN PATENT DOCUMENTS

WO   WO-2016099976 A1   6/2016
WO   WO-2016122742 A2   8/2016

OTHER PUBLICATIONS

International Search Report and Written Opinion for Application No. PCT/US2017/057626, dated Jan. 19, 2018, 12 pages.
(Continued)

*Primary Examiner* — Michael P Mooney
(74) *Attorney, Agent, or Firm* — Schwegman Lundberg & Woessner, P.A.

(57) ABSTRACT

Shape sensing with a multi-core fiber can achieve high accuracy as well as accommodate small bend radii by measuring signals with peripheral waveguide cores placed at multiple different radial distances from the center axis of the fiber, and computing strain metrics from signals of cores selected based on the respective radial distances and a determination of whether the waveguide cores have strained out of range.

20 Claims, 4 Drawing Sheets

(51) Int. Cl.
*G01M 11/08* (2006.01)
*G02B 6/02* (2006.01)

(52) U.S. Cl.
CPC ....... *G01M 11/088* (2013.01); *G02B 6/02042* (2013.01); *G02B 6/02076* (2013.01); *G02B 6/022* (2013.01)

(58) Field of Classification Search
CPC .. G01M 11/025; G01M 11/088; G01M 11/31; G01M 11/3172; G01M 11/331; G01B 11/16; G01B 11/161; G01B 11/165; G01B 11/168; G01B 11/18; G01B 11/24
See application file for complete search history.

(56) References Cited

U.S. PATENT DOCUMENTS

| | | |
|---|---|---|
| 8,400,620 B2 | 3/2013 | Froggatt et al. |
| 8,531,655 B2 | 9/2013 | Klein et al. |
| 8,773,650 B2 | 7/2014 | Froggatt et al. |
| 10,238,837 B2 | 3/2019 | Duindam et al. |
| 10,551,173 B2 * | 2/2020 | Froggatt ................ G01M 11/31 |
| 2006/0013523 A1 | 1/2006 | Childlers et al. |
| 2007/0297712 A1 * | 12/2007 | Meneghini ......... G02B 6/02042 385/13 |
| 2011/0217011 A1 | 9/2011 | Bennett et al. |
| 2012/0281205 A1 | 11/2012 | Askins |
| 2015/0268414 A1 | 9/2015 | Hayashi |
| 2019/0094459 A1 | 3/2019 | Froggatt et al. |

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.
Extended European Search Report for Application No. EP17862626.3 dated May 25, 2020, 7 pages.

* cited by examiner

SHAPE SENSING WITH MULTI-CORE FIBER SENSOR

CLAIM OF PRIORITY

This application is a U.S. National Stage Filing under 35 U.S.C. 371 from International Application No. PCT/US2017/057626, filed on Oct. 20, 2017, and published as WO 2018/075911 A1 on Apr. 26, 2018, which claims the benefit of priority to U.S. Patent Application No. 62/449,389, filed on Jan. 23, 2017, and to U.S. Patent Application No. 62/410,927, filed on Oct. 21, 2016, each of which is hereby incorporated by reference herein in its entirety.

TECHNICAL FIELD

This disclosure relates to multi-core optical fibers and their use in shape-sensing applications.

BACKGROUND

Optical fibers can be used as distributed optical sensors to measure physical properties such as, e.g., strain or temperature as a function of position along the fiber. The fiber may be interrogated, for instances, by sending light pulses down the fiber and measuring reflected or backscattered light as a function of the time delay relative to the excitation pulse (the time delay being correlated with the position along the fiber), a technique known as optical time-domain reflectometry (OTDR). Alternatively, the fiber may be interrogated with quasi-continuous light swept across a certain range of wavelengths (herein also the "tuning range"), and the reflected or backscattered frequency-dependent light signal may be measured interferometrically, aggregated over the measurement interval, and Fourier-transformed to derive a signal containing spectral information as a function of position, in a technique known as optical frequency-domain reflectometry (OFDR). Yet another approach involves wavelength division multiplexing to interrogate the fiber, using a broadband light source and a spectrometer measuring the backscattered or reflected light.

In some fiber-optic sensing applications, multi-core optical fibers are employed to simultaneously measure multiple independent signals. For example, a multi-core fiber having embedded therein a central waveguide core extending along the fiber axis and three (or more) helical peripheral waveguide cores arranged around the central waveguide core can be used to measure four independent strain signals. From these signals, in conjunction with knowledge of the relative positions of the waveguide cores along the fiber, the bend strain, twist strain, and axial strain along the fiber—collectively, the "strain profile"—can be determined. From the strain profile, the three-dimensional shape and position of the fiber can, in turn, be reconstructed.

Fiber-optic shape sensing is useful in various manufacturing, construction, medical, aerospace, and other application contexts, including, for example, in robotic surgery, where collocating a robotically operated surgical tool with the end of the shape-sensing optical fiber allows to precisely determine the location of the tool within the patient's body based on a measurement of the three-dimensional fiber shape. In this and many other application contexts, shape sensing is subject to high accuracy requirements. In principle, high accuracy can be achieved with a fiber designs that renders the strain signals measured with the fiber highly sensitive to the local twist and bend rates of the fiber (such that even slight bending and twisting translate into relatively large strain signals). In places where the fiber goes around small bends (as occur frequently in robotic-surgery applications), however, such high sensitivity can cause a waveguide core of the fiber to "strain out of range," that is, to exceed the maximum strain measurable for that core by the system. Accordingly, there is generally a trade-off between measurement accuracy and the tightest bend radii the system can accommodate.

SUMMARY

Described herein are multi-core shape-sensing fibers, as well as systems and methods employing such fibers, that facilitate measuring the strain profile and/or shape of the fiber with high accuracy while also being able to detect small bend radii. A "shape-sensing" fiber is herein broadly understood to include both bend-sensing fibers, which allow measuring the bend (radius of curvature and direction within the bend plane) along the length of the fiber, and shape-sensing fibers in the usual narrower sense, which facilitate measuring, in addition to the bend and the axial strain, the twist of the fiber, enabling, in turn, the determination of the orientation of the bend plane and, thus, of the shape of the fiber in three dimensions. Optionally, shape-sensing fibers in accordance herewith may also allow measuring additional parameters, such as the temperature of the fiber. Strain and/or shape sensing in accordance herewith involves the optical interrogation of the multi-core shape-sensing fiber to acquire a plurality of optical signals resulting from reflection of light in a plurality of respective waveguide cores of the multi-core fiber. The term "reflection" is herein broadly understood to include both specular reflection and diffuse reflection (the portion of light that is scattered back in the general direction from which it came also being referred to as "backscattered"). Reflection can result from microscopic variations intrinsic to the optical-fiber material (as is the case, e.g., in Rayleigh scattering), or from deliberately introduced refractive-index variations such as fiber Bragg gratings (FBGs).

In accordance with various embodiments, a shape-sensing multi-core fiber includes a central waveguide core along the center axis of the optical fiber and at least four helically wound peripheral waveguide cores placed at fixed radial distances from the center axis, the radial distances differing between some of the waveguide cores. (A "fixed radial distance" is herein defined as a radial distance that does not vary along the length of the fiber, such that the axis of each peripheral waveguide core lies within a cylindrical surface centered at the center axis of the fiber.) For example, the fiber may include three inner peripheral waveguide cores placed at a first radial distance and three outer peripheral waveguide cores placed at a greater second radial distance (which may, e.g., be about twice the first radial distance.) At each of a plurality of positions along the fiber, strain metrics (e.g., bend strain, twist strain, and/or axial strain) and/or other physical properties (e.g., temperature) of the fiber may be determined from signals acquired from the central waveguide core and three or more of the peripheral waveguide cores. Since the accuracy of strain computations increases with the distance of the waveguide cores from the center axis of the fiber, the computations are preferentially based on signals from the outer peripheral waveguide cores (or the peripheral waveguide cores with the longest radial distances), to the extent those cores have not strained out of range and are, thus, useful for strain measurements. In embodiments in which swept-wavelength interferometry is used to interrogate waveguide cores having fiber Bragg gratings (FBGs), for instance, a peripheral waveguide core is deemed to have strained out of range at a given position along the fiber if the wavelength reflected by the local fiber Bragg grating, which is strain-dependent, has shifted outside the tuning range of the laser. In positions where a peripheral waveguide core does strain of out range, that core is substituted, in the strain computations, by a waveguide core having a shorter distance from the center axis of the fiber (and, accordingly, being subject to a smaller strain). In many cases, this approach allows for high-accuracy strain determinations along large sections of the fiber while also facilitating strain determinations in tight bends (albeit with lower accuracy).

Accordingly, one aspect relates to a shape-sensing system including a multi-core optical fiber with an embedded central waveguide core (placed along a center axis of the optical fiber) and at least four helically wound peripheral waveguide cores placed at fixed radial distances from the center axis (including a first radial distance whose value differs from that of a second radial distance); a plurality of interrogators coupled to the central and peripheral waveguide cores; acquisition electronics at an output of the plurality of interrogators, the acquisition electronics configured to measure signals resulting at least in part from light reflected in the central and peripheral waveguide cores; and a processing facility configured to compute, for each of a plurality of positions along the fiber (which need not in every embodiment include all positions along the fiber within the spatial resolution of the system), one or more strain metrics from the signals associated with the central waveguide core and three or more of the peripheral waveguide cores. These at least three peripheral waveguide cores selected among the four or more peripheral waveguide cores based on the radial distances of the waveguide cores from the center axis in conjunction with a determination of whether the waveguide cores have strained out of range.

The processing facility may be configured to select the three or more peripheral waveguide cores used for strain computations by ranking those peripheral waveguide cores among the entirety of peripheral waveguide cores that are determined to be within range based on their respective radial distances in an order from longest radial distance to shortest radial distance, and selecting at least three of the highest-ranking waveguide cores. The determination of whether the peripheral waveguide cores have strained out of range may be based on a comparison of strain-induced wavelength shifts of respective fiber Bragg gratings against a tuning range of a laser coupling light into the plurality of interrogators. In some embodiments, the peripheral waveguide cores include a plurality of inner waveguide cores placed at the first radial distance and a plurality of outer waveguide cores placed at the second radial distance, the second radial distance being greater than the first radial distance; in this case, the processing facility may be configured to select the three outer waveguide cores if the signals associated with the three outer waveguide cores are all within range, and otherwise the three inner waveguide cores. The determination of whether the outer waveguide cores have strained out of range may be based on a comparison of respective predicted strains computed from the signals associated with the inner waveguide cores against a specified strain threshold. It is possible that, at a certain position along the fiber, all but at most one or two of the peripheral waveguide cores have strained out of range; that position is, in this case, not among the plurality of positions for which strain metrics are being computed from the measured signals.

Another aspect relates to a shape-sensing method that involves measuring optical signals resulting from interrogation of a multi-core optical fiber with a central waveguide core and at least four helically wound peripheral waveguide cores (the peripheral waveguide cores being placed at respective fixed radial distances from a center axis, a value of a first radial distance of the fixed radial distances differing from a value of at least a second radial distance of the fixed radial distances); and using a processing facility to determine, for each of a plurality of positions along the fiber, which of the at least four peripheral waveguide cores are useful for strain measurements, and to select, among the peripheral waveguide cores determined to be useful for strain measurements, at least three peripheral waveguide cores based on the respective radial distances of the peripheral waveguide cores from the center axis, giving preference to peripheral waveguide cores with greater radial distances. The method may further include computing a strain profile for the optical fiber from strain metrics evaluated, for each of the positions along the fiber, based on the signals associated with the central waveguide core and the selected peripheral waveguide cores.

A further aspect relates to a computer-readable medium storing instructions for controlling the operation of one or more hardware processors to compute a strain profile of a multi-core optical fiber from optical signals measured for a central waveguide core and at least four helically wound peripheral waveguide cores (placed at two or more different distances from the center axis, as described above) of the optical fiber. The instructions, when executed, cause the one or more hardware processors to determine, for each of a plurality of positions along the fiber, which of the peripheral waveguide cores are useful for strain measurements, and select, among the peripheral waveguide cores determined to be useful for strain measurements, at least three peripheral waveguide cores based on respective radial distances of the at least four peripheral waveguide cores from the center axis, giving preference to peripheral waveguide cores with greater distances. The instructions further cause the one or more hardware processors to compute the strain profile for the optical fiber from strain metrics evaluated, for each of the positions along the fiber, based on signals measured for the central waveguide core and the selected peripheral waveguide cores.

Yet another aspect relates to a multi-core shape-sensing optical fiber that includes a central waveguide core placed along a center axis of the optical fiber, three helically wound inner peripheral waveguide cores placed on an inner cylinder about the center axis, and three helically wound outer peripheral waveguide cores placed on an outer cylinder about the center axis, a diameter of the outer cylinder being greater than a diameter of the inner cylinder. The central waveguide core and the peripheral waveguide cores are configured to undergo low bend losses. In some embodiments, such insensitivity to fiber bending is achieved by a numerical aperture of at least 0.16 (and in some embodiments 0.2 or more) for each waveguide core. In other embodiments, losses due to fiber bending are significantly reduced by trenching, i.e., separation of the waveguide cores from the surrounding silica cladding by a fluorine-containing layer.

BRIEF DESCRIPTION OF THE DRAWINGS

The foregoing will be more readily understood from the following description of various example embodiments, in particular, when taken in conjunction with the accompanying drawings, in which.

DETAILED DESCRIPTION

Figure 1:
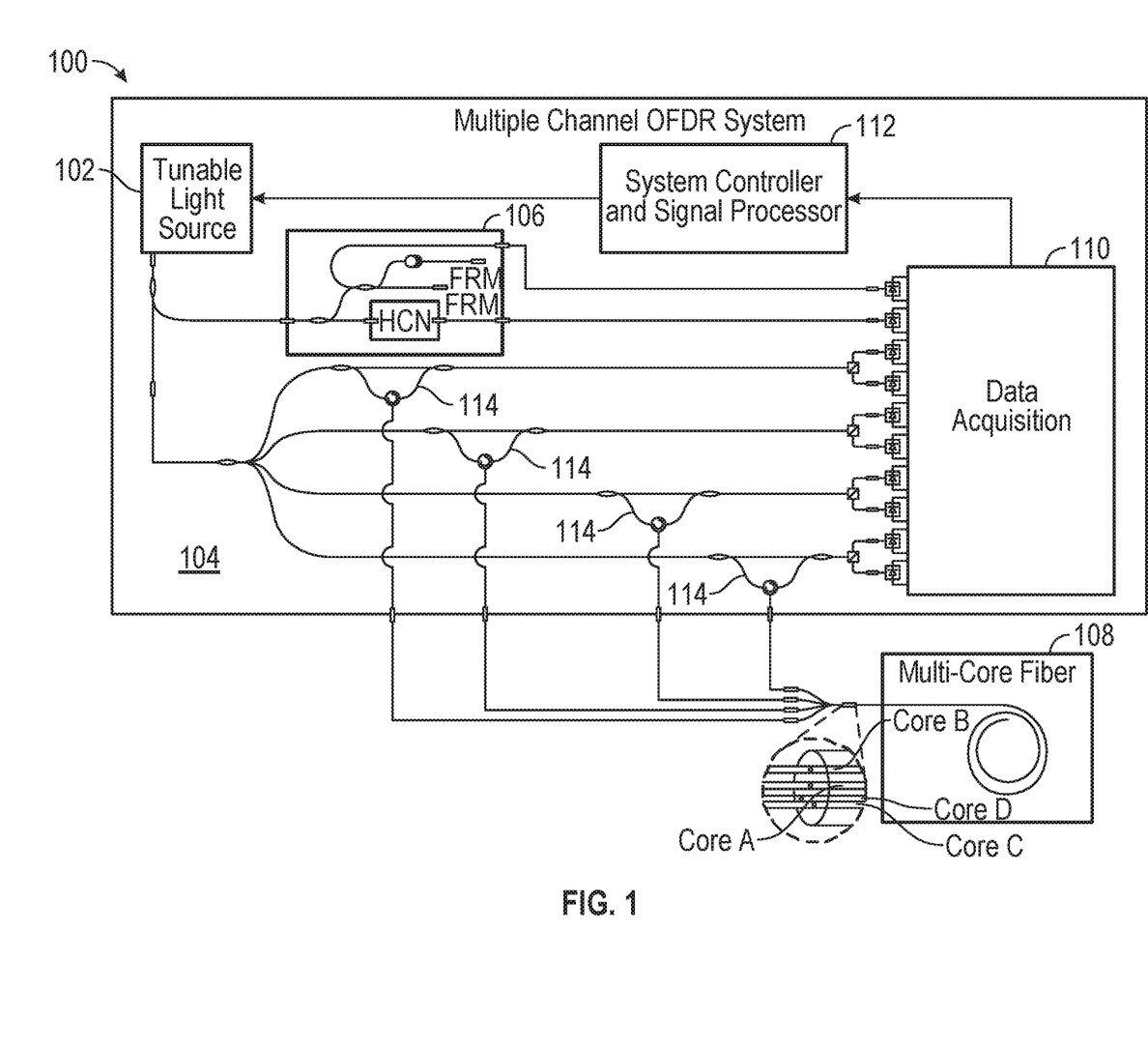
FIG. 1 is a block diagram illustrating an example fiber-optic shape-sensing system in accordance with various embodiments.

FIG. 1 illustrates an example fiber-optic shape-sensing system 100 in accordance with various embodiments. This example system 100 is based on OFDR and swept-wavelength interferometry, and includes a tunable light source (often a coherent light source such as a laser) 102, an interferometric interrogator network 104, a laser monitor network 106, a multi-core optical shape-sensing fiber 108 (herein also more briefly referred to as "multi-core optical fiber" or "shape-sensing fiber"), an acquisition unit 110 including data acquisition electronics, optical fiber that optically couples the aforementioned components, and a processing facility 112 serving as system controller and data processor. While depicted as a single unit, the processing facility 112 may be implemented with one or more devices, and may include special-purpose electronic circuitry (e.g., a hardwired circuit, digital signal processor, field-programmable gate array, or the like) and/or a general-purpose processor executing suitable software.

Figure 2:
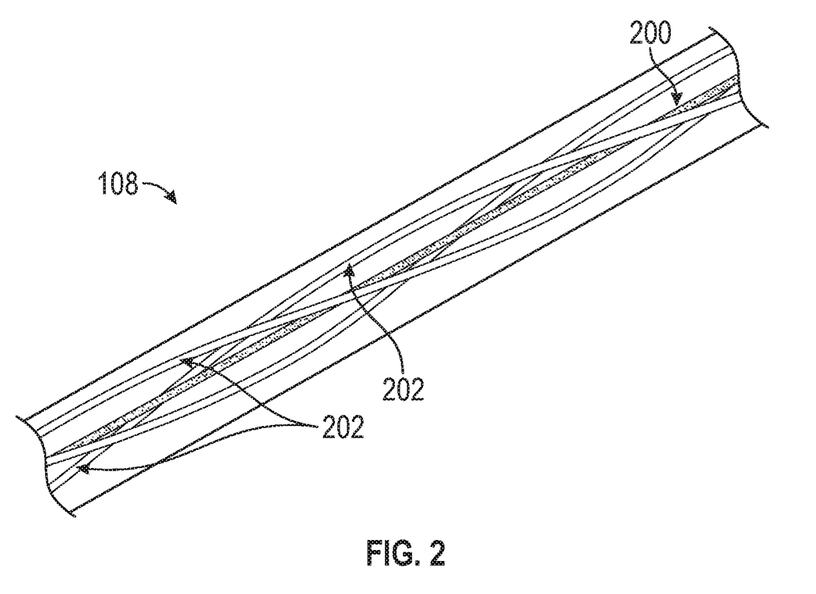
FIG. 2 is a perspective view of an example multi-core shape-sensing fiber, illustrating the helical winding of peripheral waveguide cores in accordance with various embodiments.

As illustrated in FIG. 2, the multi-core optical fiber 108 includes a central waveguide core 200 located about the center axis of the fiber and multiple peripheral waveguide cores 202 arranged helically around the center core at a given radial distance therefrom. Three peripheral waveguide cores that do not fall on a single straight line generally allow determining the bend of the fiber, while the addition of the central waveguide core enables discriminating between axial strain and twisting of the fiber (as twisting stretches the peripheral waveguide cores, but not the central waveguide cores). The helicity of the peripheral waveguide cores serves to determine the direction of any fiber twisting, with twisting in one directing increasing the intrinsic (built-in) rate of twist (or "spin rate") of the peripheral waveguide core and twisting in the other direction decreasing the intrinsic spin rate. While FIG. 2 shows, for simplicity of illustration, only three peripheral waveguide cores 202, as are commonly used for strain computations at a given position along the length of the fiber, multi-core optical fibers 108 in accordance with various embodiments include at least four peripheral waveguide cores 202 placed at multiple (that is, at least two) different radial distances from the central waveguide core 200. The use of four or more peripheral waveguide cores 202, which is further illustrated in FIG. 3 described below, generally allows, at each position along the fiber, for the selection of a subset of waveguide cores 202 that provides for the most accurate strain computation at that position.

Strain measurements taken along the length of each core, in conjunction with knowledge of the relative positions of the cores along the length of the shape-sensing fiber, can be combined to obtain a strain profile of the fiber (e.g., including measures of bend, twist, and axial strains), from which the three-dimensional position and orientation of the fiber may be reconstructed.

In some embodiments, the waveguide cores 200, 202 implement fiber Bragg gratings (FGBs) formed by (at least locally) periodic variations in the refractive index. These periodic index variations may extend along the entire (or almost the entire) length of the fiber 108 to form a single contiguous FBG, or may alternatively be spaced apart to form multiple FBGs along the fiber 108. An FBG reflects light of a certain wavelength (the "Bragg" wavelength) that depends on the period of the index variations (or "grating period"), and transmits all other wavelengths. Since the grating period is affected by strain, measurement of the reflected wavelength for any position along the fiber allows determining the local strain. In other embodiments, Rayleigh scattering off of the intrinsic variations in the waveguide cores 200, 202 is used to determine the spectral properties of the backscattered light, which are likewise strain-dependent.

With renewed reference to FIG. 1, during an OFDR measurement, the light source 102 is swept through a range of wavelengths (the tuning range). Light emitted by the light source 102 is split with the use of optical couplers and routed to the laser monitor network 106 and the interferometric interrogator network 104. The laser monitor network 106 contains a gas cell (e.g., using hydrogen cyanide (HCN) gas for a C-band light source) that provides an absolute wavelength reference throughout the measurement scan, and an interferometer (e.g., a quadrature interferometer) used to measure fluctuations in tuning rate as the light source is scanned through the tuning range.

The interferometric interrogator network 104 includes multiple interferometric interrogators 114, generally one for each waveguide core (200, 202) in the optical shape-sensing fiber 108. While four waveguide cores (one central and three peripheral) are shown for simplicity of illustration, it is to be understood that, in accordance with various embodiments, the optical shape-sensing fiber 108 includes at least four (e.g., six) peripheral waveguide cores 202 in addition to the central waveguide core 200, and the interferometric interrogator network 104 accordingly includes more than four interferometric interrogators 114. Each interferometric interrogator 114 is coupled, in its measurement arm, to one of waveguide cores 200, 202 of the multi-core optical fiber 108; the pairing of one interferometric interrogator and the associated waveguide core is often referred to as an "acquisition channel". In each such channel, light received from the light source 102 enters the respective waveguide core of the multi-core optical fiber 108 through the measurement and of the respective interferometric interrogator 114, and light reflected (e.g., backscattered or reflected at FBGs) in the waveguide core is coupled back into the measurement arm. Upon exiting the measurement arm, the reflected light is then interfered with light that has traveled along and is exiting the reference arm of the interferometric interrogator 114. The interference signal is separated into two orthogonal polarization components (by an optical polarization beam splitter), which are measured by two detectors (e.g., photodiodes) of the acquisition unit 110. The optical detectors measuring the interference pattern(s), and additional detectors in the data acquisition unit 110 for measuring light signals from the gas cell and interferometer of the laser monitor network 106, convert the received light into electrical signals. The processing facility 112 can process the electrical signals resulting from the measured interference pattern for the two polarization states to determine, e.g., the orientation, temperature, and/or strain of the sensing fiber as a function position along the fiber.

In more detail, in some embodiments, the data acquisition unit 110 uses the information from the laser monitor network 106 to resample the detected interference pattern of the optical shape-sensing fiber 108 to obtain samples at increments constant in optical frequency. Once resampled, the data is Fourier-transformed by the processing facility 112 to produce a light reflection signal in the temporal domain. In the temporal domain, the amplitudes of the light reflection events are depicted verses delay along the length of the shape-sensing fiber 108. Using the distance that light travels in a given increment of time, this delay can be converted to a measure of length along the shape-sensing fiber 108. In other words, the light reflection signal indicates each reflection event as a function of position along the fiber; the sampling period is referred to as the spatial resolution and is inversely proportional to the frequency range that the tunable light source 102 was swept through during the measurement.

As the tunable light source 102 is swept across the tuning range, the optical spectrum of the reflected light is measured. In FBG-based embodiments, for example, only a narrow band of wavelengths is reflected back. In Rayleigh-based embodiments, light may be backscattered at all wavelengths, but with varying amplitude or intensity for different wavelengths. If the shape-sensing fiber 108 is subject to strain, the local spectrum (e.g., the reflected wavelength) of a given waveguide core at a given position shifts as the waveguide core changes in physical length. These spectral changes (whether in FBG-reflected or Rayleigh-scattered light) are highly repeatable for a given strained (or unstrained) state of the fiber. Hence, an OFDR measurement of detected light scatter or reflection for the shape-sensing fiber 108 can be retained in memory to serve as a reference pattern of the sensing fiber in an unstrained state (or, more generally, a state for which the strain profile and/or shape of the fiber are known). A subsequently measured signal when the shape-sensing fiber 108 is under strain may then be compared to this reference pattern by the processing facility 112 to obtain a measure of wavelength shift along the length of the sensing fiber 108, which may be converted to strain, producing a continuous measurement of strain along the shape-sensing fiber 108. With a multi-core optical fiber 108 interrogated using OFDR, multiple strain metrics, including bend, twist, and axial strain (or tension), can be measured simultaneously in a distributed fashion. This information can be used, in turn, to calculate the path of the fiber in space.

While a specific example shape-sensing system has been described in detail, it is to be understood multi-core shape-sensing fibers in accordance herewith may also be interrogated using different systems and techniques. For example, optical time-domain reflectometry may be employed instead of OFDR, and a broad-band light source in conjunction with interrogators including spectrometers may be used in lieu of narrow-band light and interferometric interrogators.

The accuracy of fiber-optic shape-sensing systems (such as, e.g., system 100 described above) is usually limited primarily by the sensitivity of the measured signals to twist, and secondarily by the sensitivity to bend. Both twist and bend sensitivity of the shape-sensing fiber 108 are related to the distance of the peripheral cores 202 from the center axis (or "neutral" axis) of the fiber 108: the further the peripheral waveguide cores are from the center axis, the more strain is generated for a given amount of twist or a given bend radius.

The following formula show the factors that impact the measurement of twist:

$$\frac{d\phi}{d\tau} = C * r^2 * \frac{d\theta}{d\ell}$$

Herein, $$\frac{d\phi}{d\tau}$$

is the change in phase $\phi$ of the optical signal measured for a unit change $\tau$ in twist in the optical fiber; r is the radial distance of the peripheral core 202 from the center axis of the fiber 108;

$$\frac{d\theta}{d\ell}$$

is the intrinsic spin rate of the peripheral core (i.e., the spin rate as unaffected by strain), i.e., the intrinsic amount of twist per unit length of fiber; and C is a constant. According to this model, the change in phase as a function of twist is proportional to the intrinsic spin rate $$\frac{d\theta}{d\ell}$$

and to the square of the radial distance r of the peripheral cores. Thus, doubling the twist rate will double the twist measurement accuracy, but doubling the radial distance of the peripheral cores will quadruple the twist measurement accuracy.

The bend sensitivity is characterized as follows:

$$\frac{d\phi}{dB_Y} = C * r * \sin(\theta) \text{ and } \frac{d\phi}{dB_X} = C * r * \cos(\theta)$$

Herein, $$\frac{d\phi}{dB_Y} \text{ and } \frac{d\phi}{dB_X}$$

and are the changes in phase $\phi$ of the optical signal measured for a unit change in bend in bend planes perpendicular to the x and y axes, respectively, of a Cartesian coordinate system oriented with the z axis along the fiber; r is the radial distance of the peripheral core 202 from the center axis of the fiber 108; and $\theta$ is the twist angle of the waveguide core. As is apparent from these formulas, bend measurements, although not as strongly dependent on the radial distance as twist measurements, still benefit from larger radial distances as the bend sensitivity is proportional to the radial distances.

As the above relationships suggest, it is, in principle, desirable to locate the peripheral waveguide cores 202 radially as far away from the center axis of the fiber 108 as possible with a particular design to maximize the measurement accuracy by maximizing the strain generated due to twist and bend. However, maximizing the strain makes sense only to the extent the shape-sensing system can read the strain. In embodiments that utilize swept-wavelength interferometry, the level of strain the system can read is generally proportional to the tuning range of the laser (or other light source). For example, in FBG-based measurements, the strain-induced shift in the reflected wavelength can be measured as long as it is within the tuning range of the laser. As the reflected wavelength band crosses the boundary of the tuning range, the amplitude of the reflection signal rolls off, and the signal-to-noise ratio degrades as a result, until the reflection signal has vanished entirely. While the tuning range of the laser may be adjustable, the larger the tuning range of the system, the slower is the tuning rate (i.e., the number of sweeps per unit time), and a slow rate of tuning can make the system more sensitive to vibration. Thus, faster tuning is desired in some embodiments; in other words, the tuning range may be limited. As a result, there is an upper limit to the strain measurable by the system, and therefore, for a given radial distance of the peripheral waveguide cores, a lower limit to the detectable bend radius. Conversely, for a system configured to handle a given smallest bend radius, which imposes a maximum on the radial distance of the peripheral waveguide cores, the accuracy of the system is limited. In general, the accuracy of the system drops as the system is configured to handle tighter bend radii. Accordingly, there is generally a trade-off between measurement accuracy and the tightest bend radii the system can accommodate.

Many shape-sensing applications, including, in particular, many medical applications, involve bending a sensing fiber tightly. For example, in robot-assisted medical procedures such as diagnostics or surgery, one or more medical instruments or other tools (e.g., biopsy instruments such as needles, forceps, or brushes, image capture probes, imaging sensors such as endoscopes and radial ultrasound probes, laser ablation fibers, scalpels, other forceps or needles, etc.) may be delivered to a target location within a patient via a catheter or other device with a flexible elongate section. A shape-sensing fiber may run through part or all of the catheter, allowing determination of the orientation or location of the distal end or some other part of the catheter, and thus of the instrument or tool, within the patient. This determination can be based on knowledge of the three-dimensional shape of the fiber and the location of the fiber's proximal end. An example of a catheter with a fiber-optic shape sensor is discussed in U.S. Pub. 2013/0096497. In such applications, the fiber may traverse tight bends, for instance, if the catheter follows the curves of a blood vessel, air passages of the lung, or other tubular structure, or if the operator controls the catheter movement to achieve such tight bends without being constrained by a tubular structure. It would be helpful, in these and other situations involving tight fiber bends, to separate the desire for widely spaced waveguide cores giving high accuracy from that for tightly spaced waveguide cores giving the ability to measure with small bend radii. This separation can be achieved, in accordance with various embodiments, by embedding waveguide cores at multiple different distances from the center axis. Waveguide cores placed at a smaller radial distance can then be used to measure through tight bends (such as, e.g., at the tip of a steerable catheter), while waveguide cores placed at larger distances can be used to achieve higher measurement accuracy at other locations (e.g., the start of the tip region of the catheter).

Figure 3:
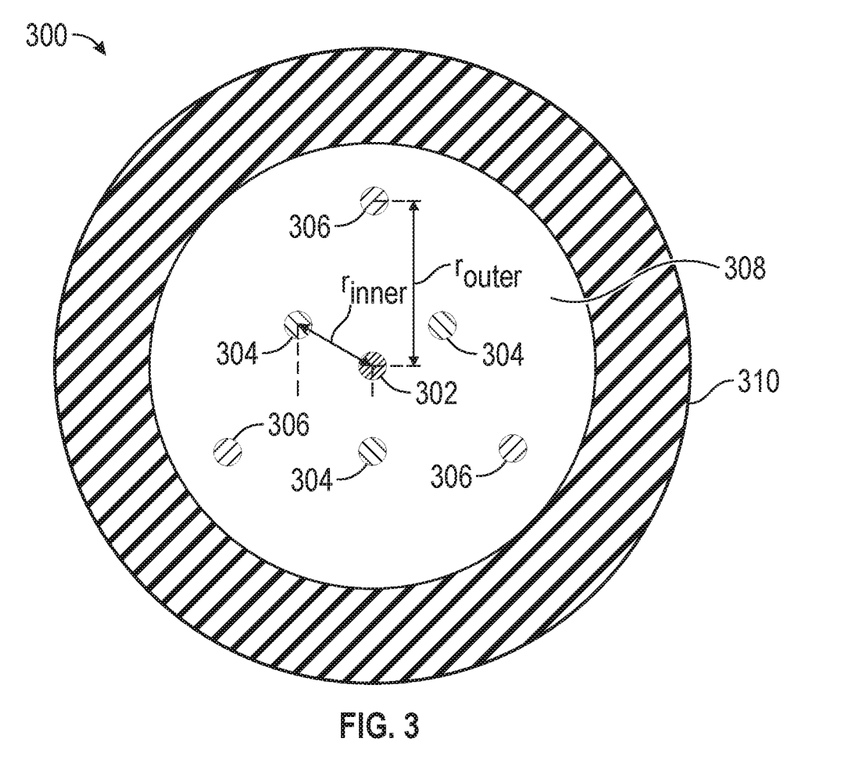
FIG. 3 is a cross-sectional view of an example multi-core shape-sensing fiber with peripheral waveguide cores placed at two different distances from the center, in accordance with various embodiments.

FIG. 3 is a cross-sectional view of an example multi-core shape-sensing fiber 300 with peripheral waveguide cores placed at two different distances from the center, in accordance with various embodiments. In the depicted example, the fiber 300 includes, in addition to the central waveguide core 302, six peripheral waveguide cores. Three "inner" peripheral waveguide cores 304 are placed at a first, inner radial distance $r_{inner}$, and three "outer" peripheral waveguide cores 306 are placed at a second, outer radial distance $r_{outer}$. The outer radial distance is greater than the inner radial distance. For example, as shown, the outer radial distance may be about twice the inner radial distance (as is convenient, e.g., with the manufacturing approach explained with reference to FIG. 4 below). The waveguide cores 302, 304, 306 may be made of doped silica and may be embedded in a pure-silica cladding 308. The cladding is surrounded by a fiber coating 310, e.g., of silicone.

The inner and outer peripheral waveguide cores 304, 306 may be disposed helically within the multi-core fiber 300 so as to "spin" around the neutral axis along the length of the multi-core fiber 300 (e.g., as shown in FIG. 2 for a single triad of waveguide cores). Within cross-sections of the fiber normal to the fiber axis, the triad of inner peripheral waveguide cores 304 and the triad of outer peripheral waveguide cores 306 may each be positioned at the vertices of respective equilateral triangles, as illustrated in FIG. 3. However, other, less regular arrangements are also possible, and there is generally no requirement to place any two peripheral waveguide cores at the same radial distance (although regular arrangements and groups of waveguide cores sharing a common distance from the center axis may be beneficial in that they can simplify fiber manufacturing and/or signal processing). Further, the number of waveguide cores may vary between embodiments. With at least four peripheral waveguide cores placed at at least two different radial distances, a radial-distance-based selection of three peripheral waveguide cores for three-dimensional strain-profile computations in accordance herewith is possible. Additional waveguide cores may increase the choices for balancing the trade-off between accuracy and detectability of tight bends, and may further provide for measurement redundancy or allow for measurements of additional physical properties of the fiber, such as, e.g., temperature. Beyond six peripheral waveguide cores, however, the benefit of adding further peripheral waveguide cores may taper off, and become outweighed by the increased cost.

Multi-core optical fibers can be manufactured, for example, by creating a fiber preform and then drawing that preform on a fiber tower. The preform may have a diameter much larger than that of the finished fiber, and the cross-section of the preform can resemble a larger version of the cross-section of the finished fiber. To construct the preform, rods (e.g., glass rods) may be stacked, e.g., in a hexagonal grid, and a tube may then be collapsed around the stack of rods. Some of the rods in the stack may be made of pure silica to form the cladding of the fiber, while others may be doped in a region surrounding the center axis of the rods, e.g., with germanium, to provide the waveguide cores. These core-forming rods themselves may be made by depositing the dopant on the interior surface of a silica tube and then collapsing the tube (e.g., by pulling the fiber under heat and vacuum). Alternatively to stacking and collapsing rods, the preform may be created by drilling bores into a silica preform and then inserting doped-silica rods into the bores. Either way, while the fiber is being drawn, it may be physically spun such that the peripheral waveguide cores form helices about the center axis.

Figure 4:
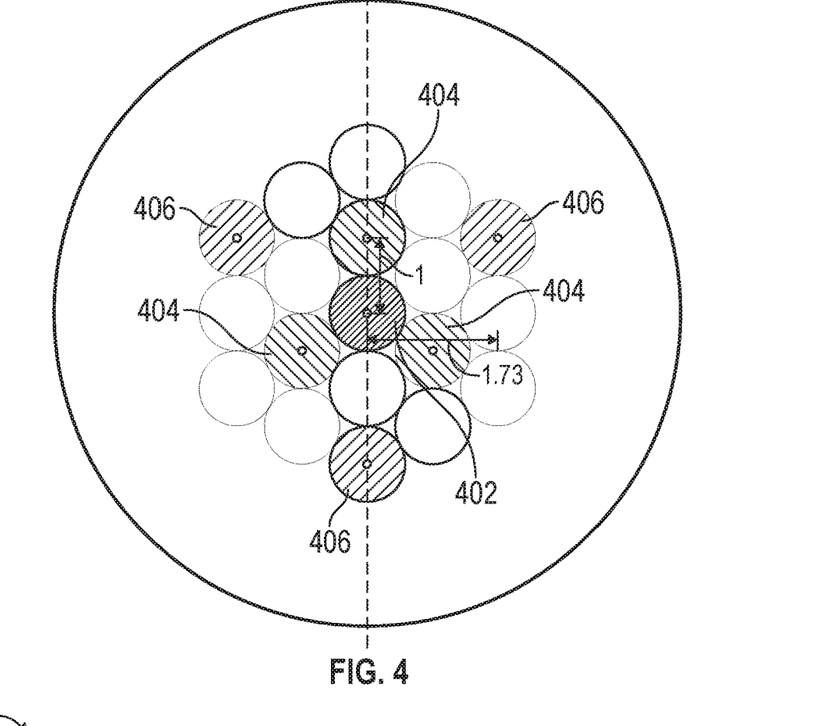
FIG. 4 is a cross-sectional view of an example fiber preform from which the fiber of FIG. 3 can be manufactured, in accordance with various embodiments.

FIG. 4 is a cross-sectional view of an example fiber preform 400 from which the fiber of FIG. 3 can be manufactured, in accordance with various embodiments. This preform 400 includes a tightly packed hexagonal set of rods all having the same diameter. Some of these rods are shown in cross-section as circular outlines. Located at the center of the preform 400 is a center-core rod 402 that includes, along the center axis of the rod 402, a center core (indicated in FIG. 4 by a small circle at the middle of the center-core rod 402) that will form the central waveguide core 302 of the finished fiber. Three inner-core rods 404 used to provide the three inner peripheral waveguide cores 304 are located in the first, innermost hexagonal ring of rods surrounding the center-core rod 402, at the vertices of an equilateral triangle coinciding with three of the vertices of the hexagon. Each of these three inner-core rods 404 includes an inner core whose center is at a normalized distance of one rod diameter from the center of the center-core rod 402. Three outer-core rods 406 used to provide the three outer peripheral waveguide cores 306 are located in the second hexagonal ring of rods (which immediately surrounds the first ring), at the vertices of a second equilateral triangle coinciding with three of the vertices of the second hexagon. Each of these three outer-core rods 406 includes an outer core whose center is at a normalized distance of two rod diameters from the center of the center core rod 402. These locations of the rods 404, 406 for the inner and outer peripheral waveguide cores 304, 306 provide a dimensional relationship convenient for this packing approach. In an alternative dimensional relationship likewise convenient for hexagonal packing, the three outer-core rods are located at centers of the edges of the second hexagon (rather than at the vertices of the hexagon), resulting in a normalized distance of 1.73 rod diameters from the center of the center core rod 402. In embodiments in which a solid silica rod is drilled to locate the cores, by contrast, arbitrary core locations can readily be achieved. As can be seen from these examples, the dimensional relationships between the waveguide cores within a multi-core optical fiber may be determined based on their suitability for a particular fiber manufacturing process.

Apart from its dependence on the manufacturing approach, the materials, dimensions, and/or dimensional relationships of the multi-core optical fiber may be defined at least in part by the intended use of the final product. For example, an optical fiber intended for shape sensing for a surgical catheter may have materials and dimensions suited for use for shape sensing in a surgical environment. In accordance with various embodiments, the shape-sensing fiber is configured such that the waveguide cores experience low losses even in the tightest bends expected in a given application. For example, the central waveguide core and the peripheral waveguide cores may each have a numerical aperture (NA, defined as $NA=\sqrt{n_1^2-n_2^2}$, where $n_1$ and $n_2$ are the refractive indices of the waveguide core and surrounding cladding, respectively) of at least 0.16 in order to keep most of the light within the core even at small bend radii. With numerical apertures of at least 0.2, light losses are negligible even at the tight bends sometimes encountered in robot-assisted medical applications as described above (where the fiber is, e.g., fed through a catheter inserted into the body). Alternatively to selecting a high refractive index for the waveguide cores, which can result in undesirable coupling losses at the input and output of the fiber, the waveguide cores may be "trenched," that is, surrounded by a thin region of a material characterized by a low refractive index (e.g., fluorine).

Table 1 below shows an example set of dimensions and materials for the construction of a multi-core optical fiber 300 with seven cores (a central core and inner and outer triads) as depicted in FIG. 3, made using the packing approach associated with FIG. 4.

TABLE 1

| Parameter | Value | Unit |
|---|---|---|
| Cladding Diameter | 250 | μm |
| Cladding Material | Pure Silica | — |
| Large Triad Core Radial Distance | 90.0 | μm |
| Small Triad Core Radial Distance | 45.0 | μm |
| Center Core Concentricity in Glass | ±0.3 | μm |
| Twist rate | ≥65 | per meter |
| Special Doping Requirements | | |
| Large triad and center | None | — |
| Small triad | 0.6% Boron | — |
| Core NA (all 7 cores) | 0.17 | — |

Of course, embodiments may differ in the materials, dimensions, and related parameters. Table 2 shows, for example, an alternative set of radial distances for the inner and outer cores for a smaller-diameter fiber.

TABLE 2

| Cladding Diameter | 125 | μm |
|---|---|---|
| Large Triad Core Radius | 50.0 | μm |
| Small Triad Core Radius | 25.0 | μm |

Having described multi-core fiber structures in accordance with various embodiments, methods of employing such fibers for shape-sensing applications will now be addressed. The methods may be carried out, e.g., using a shape-sensing system 100 as described in FIG. 1.

Figure 5:
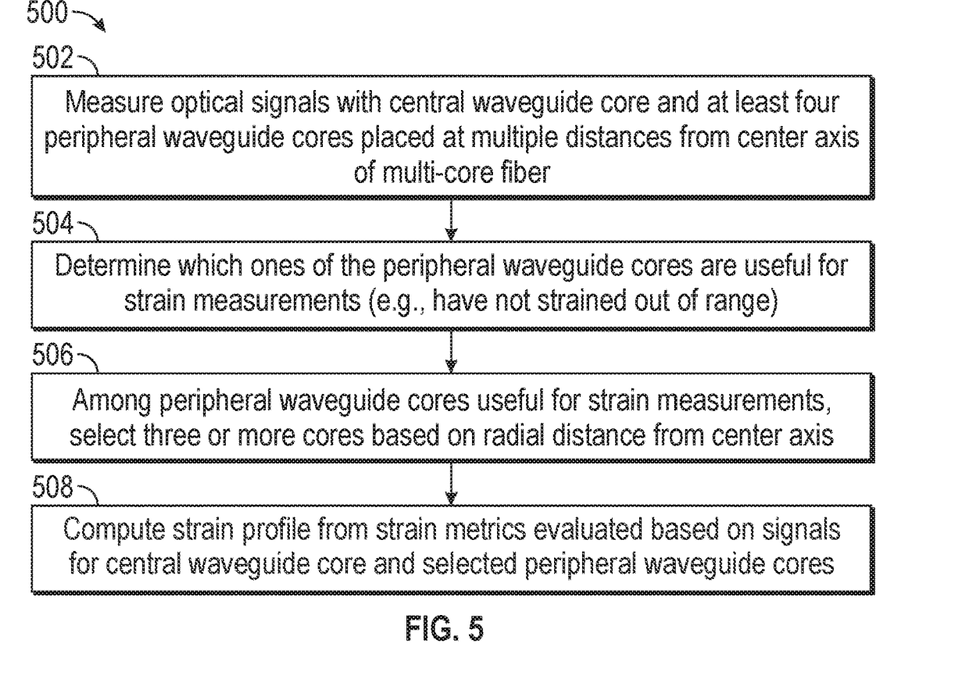
FIG. 5 is a flow chart illustrating an example shape-sensing method in accordance with various embodiments.

FIG. 5 is a flow chart illustrating an example shape-sensing method 500 in accordance with various embodiments. The method 500 begins with the measurement of optical signals resulting from the reflection of light in a central waveguide core and at least four helically wound peripheral waveguide cores of a multi-core optical fiber, the peripheral waveguide cores being placed at respective fixed radial distances from a center axis, with values of the radial distance differing between at least two peripheral waveguide cores (act 502). The measurements may be carried out, for instance, using multi-channel swept-wavelength interferometry (with a system such as, e.g., the OFDR system 100 depicted in FIG. 1), which involves sweeping the wavelength of a laser (or other light source) across a tuning range, coupling the light via interferometers into multiple waveguide cores of the optical fiber, and measuring light backscattered or reflected in the waveguide cores at the output of the interferometer. The measurement generally involves converting optical signals into electrical signals, which can thereafter be processed with a processing facility including a suitable combination of hardware, firmware, and software. The processing facility may, for instance, be or include a computer as illustrated and described below with respect to FIG. 6.

Processing the signals involves, in act 504, determining which of the peripheral waveguide cores have not strained out of range (or, in other words, are "within range"), meaning that the strains they are under are sufficiently small to render the waveguide cores still useful for strain measurements. Whether a waveguide core is within range may be determined in different ways, depending. e.g., on the underlying method by which strain is measured and/or on requirements of the particular application. For example, in the swept-wavelength interferometric interrogation of fiber cores with FBGs, a waveguide core can be deemed within range as long as the Bragg wavelength, as shifted by strain, is still within the tuning range of the light source. More precisely, to account for the finite width of the reflection band, which results in a gradual decrease in the signal amplitude of the reflected light as the reflection band crosses the boundary of the tuning range, a waveguide core may be defined as within range as long as the signal amplitude exceeds the noise floor by a specified factor (e.g., a factor of 1, or a higher factor to provide higher measurement quality). In embodiments that measure Rayleigh-backscattered light, which generally extends across a wider range of frequencies, the signal amplitudes will not vary significantly with strain, but the correlation of the signal with the reference signal obtained in the unstrained state will degrade gradually as the spectrum of the backscattered light shifts further and further from that of the unstrained reference state; in this case, a correlation metric below which the waveguide core is deemed to have strained out of range may be defined. In some embodiments, a strain threshold beyond which a waveguide core is out of range is specified. This threshold may be based, e.g., on empirical data for the usefulness of signals for strain determinations. Given such a strain threshold, a determination of whether an outer peripheral waveguide core (understood to be, e.g., any except the three innermost peripheral waveguide cores) has strained out of range may be based on a strain estimate computed for the waveguide core based on strain metrics obtained from processing the signals acquired by three inner waveguide cores, and comparison of the estimated strain against the strain threshold.

Once it has been determined which of the peripheral waveguide cores are within range and, thus, useful for strain measurements, three or more of the useful peripheral waveguide cores are selected for strain computations, at least in part based on their respective radial distances from the center axis of the fiber (act 506). For example, in order to maximize the accuracy of the strain computation, the waveguide cores (among those within range) that have the longest radial distance from the center axis may be chosen. Thus, if in a fiber configuration including an inner triad of waveguide cores at a first distance and an outer triad of waveguide cores at a second distance only one of the outer waveguide cores strains out of range at a given position along the fiber, the remaining useful two outer waveguide cores may be used in conjunction with one of the inner waveguide cores to determine the strain of the fiber at that position. Alternatively, it may be beneficial in some embodiments to use three peripheral waveguide cores all sharing a common radial distance. In this case, the strain computation would be based on the signals measured for the outer peripheral waveguide cores if all three of them are within range, and otherwise with the three inner waveguide cores.

Whichever way the peripheral waveguide cores are selected, one or more strain metrics (e.g., bend, twist, and axial strains) and/or associated fiber-shape parameters (e.g., bend curvature and direction, twist and twist direction, fiber stretching) are then evaluated based on the signals obtained for the selected peripheral waveguide cores as well as the central waveguide cores. From these metrics, as determined for a plurality of positions along the fiber (e.g., all positions in accordance with the spatial resolution of the measurements, so long as at least three peripheral waveguide cores are within range for each), a strain profile and/or the shape of the fiber is then computed (act 508).

Various embodiments described herein include signal/data-processing functionality, which may generally be provided by a combination of software- and/or hardware-implemented modules, components, or mechanisms. Software-implemented modules (e.g., program code) may be embodied on a non-transitory machine-readable medium. A hardware-implemented module is a tangible unit capable of performing certain operations, and can be configured or arranged in a certain manner. In example embodiments, one or more computer systems (e.g., a standalone, client, or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier. e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 6:
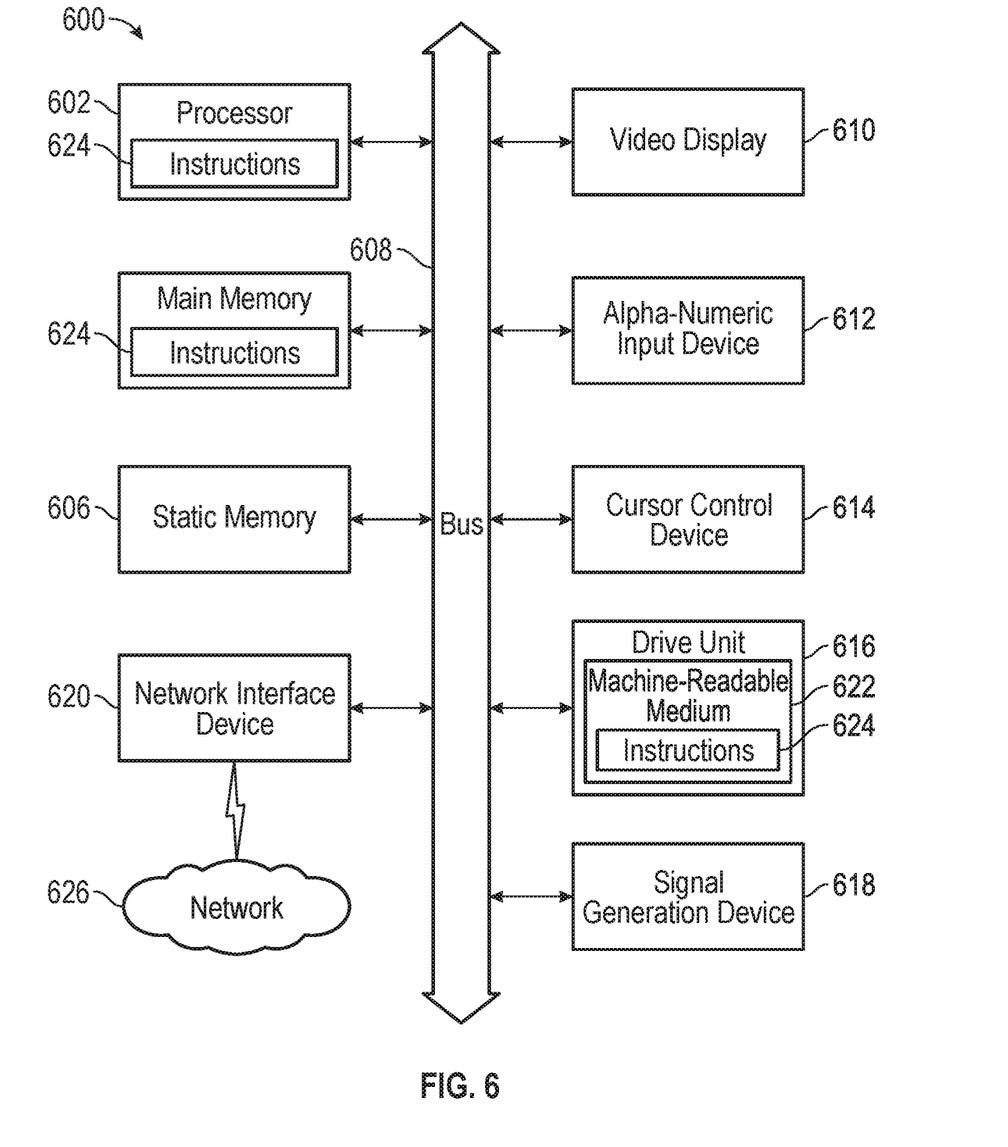
FIG. 6 is a block diagram of an example processing facility in accordance with various embodiments.

FIG. 6 is a block diagram of an example processing facility in accordance with various embodiments, taking the form of a computer system 600 within which instructions 624 may be executed to cause the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 can further include a video display 610 (e.g., a liquid crystal display (LCD) or a cathode ray tube (CRT)). The computer system 600 also includes an alpha-numeric input device 612 (e.g., a keyboard or a touch-sensitive display screen), a user interface (UI) navigation (or cursor control) device 614 (e.g., a mouse), a disk drive unit 616, a signal generation device 618 (e.g., a speaker), and a network interface device 620.

The disk drive unit 616 includes a machine-readable medium 622 on which are stored one or more sets of data structures and instructions 624 (e.g., software) embodying or utilized by any one or more of the methodologies or functions described herein. The instructions 624 can also reside, completely or at least partially, within the main memory 604 and/or within the processor 602 during execution thereof by the computer system 600, with the main memory 604 and the processor 602 also constituting machine-readable media 622.

While the machine-readable medium 622 is shown in an example embodiment to be a single medium, the term "machine-readable medium" can include a single medium or multiple media (e.g., a centralized or distributed database, and/or associated caches and servers) that store the one or more instructions 624 or data structures. The term "machine-readable medium" shall also be taken to include any tangible medium that is capable of storing, encoding, or carrying instructions 624 for execution by the machine and that cause the machine to perform any one or more of the methodologies of the present disclosure, or that is capable of storing, encoding, or carrying data structures utilized by or associated with such instructions 624. The term "machine-readable medium" shall accordingly be taken to include, but not be limited to, solid-state memories, and optical and magnetic media. Specific examples of machine-readable media 622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 624 can be transmitted or received over a communication network 626 using a transmission medium. The instructions 624 can be transmitted using the network interface device 620 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 624 for execution by the machine, and includes digital or analog communications signals or other intangible media to facilitate communication of such software.

While the disclosed subject matter has been described and explained herein with respect to various example embodiments, these examples are intended as illustrative only and not as limiting. Various modifications, additional combinations of features, and further applications of the described embodiments that do not depart from the scope of the subject matter may occur to those of ordinary skill in the art. Accordingly, the scope of the inventive subject matter is to be determined by the scope of the following claims and all additional claims supported by the present disclosure, and all equivalents of such claims.

What is claimed is:

1. A shape-sensing system comprising:
    a multi-core optical fiber having embedded therein:
        a central waveguide core placed along a center axis of the optical fiber; and
        at least four helically wound peripheral waveguide cores placed at fixed radial distances from the center axis, a value of a first radial distance of the fixed radial distances differing from a value of at least a second radial distance of the fixed radial distances; and
    a plurality of interrogators coupled to the central and peripheral waveguide cores;
    at an output of the plurality of interrogators, acquisition electronics configured to measure signals resulting at least in part from light reflected in the central and peripheral waveguide cores; and
    a processing facility configured to compute, for each of a plurality of positions along the fiber, one or more strain metrics from the signals associated with the central waveguide core and at least three peripheral waveguide cores selected among the at least four peripheral waveguide cores based on the fixed radial distances of the waveguide cores from the center axis in conjunction with a determination of whether the waveguide cores have strained out of range.

2. The system of claim 1, wherein the processing facility is configured to select the at least three peripheral waveguide cores by ranking those peripheral waveguide cores among the at least four peripheral waveguide cores that are determined to be within range based on their respective radial distances in an order from longest radial distance to shortest radial distance, and selecting at least three of the highest-ranking waveguide cores.

3. The system of claim 1, wherein the peripheral waveguide cores comprise a plurality of inner waveguide cores placed at the first radial distance and a plurality of outer waveguide cores placed at the second radial distance, the second radial distance being greater than the first radial distance.

4. The system of claim 3, wherein the second radial distance is greater than then the first radial distance by a factor of at least 1.7.

5. The system of claim 3, wherein the second radial distance is about twice the first radial distance.

6. The system of claim 3, wherein the plurality of inner waveguide cores comprises three inner waveguide cores positioned at vertices of a first equilateral triangle, and wherein the plurality of outer waveguide cores comprises three outer waveguide cores positioned at vertices of a second equilateral triangle.

7. The system of claim 6, wherein the processing facility is configured to select, for computing the one or more strain metrics, the three outer waveguide cores if the signals associated with the three outer waveguide cores are all within range, and otherwise the three inner waveguide cores.

8. The system of claim 3, wherein the peripheral waveguide cores consist of no more than six cores.

9. The system of claim 3, wherein the determination of whether the outer waveguide cores have strained out of range is based on a comparison of respective predicted strains computed from the signals associated with the inner waveguide cores against a specified strain threshold.

10. The system of claim 1, wherein the optical fiber is manufactured from a preform comprising a hexagonal arrangement of nineteen silica rods all sharing a common diameter, a central one of the rods and between four and six other ones of the nineteen silica rods being doped to form the central and peripheral waveguide cores.

11. The system of claim 1, wherein the central and peripheral waveguide cores include fiber Bragg gratings, and wherein the determination of whether the peripheral waveguide cores have strained out of range is based on a comparison of strain-induced wavelength shifts of respective fiber Bragg gratings against a tuning range of a laser coupling light into the plurality of interrogators.

12. A method comprising:
    measuring optical signals resulting from interrogation of a multi-core optical fiber including a central waveguide core and at least four helically wound peripheral waveguide cores, the peripheral waveguide cores being placed at respective fixed radial distances from a center axis, a value of a first radial distance of the fixed radial distances differing from a value of at least a second radial distance of the fixed radial distances; and
    using a processing facility to determine, for each of a plurality of positions along the fiber, which of the at least four peripheral waveguide cores are useful for strain measurements, and to select, among the peripheral waveguide cores determined to be useful for strain measurements, at least three peripheral waveguide cores based on the respective fixed radial distances of the peripheral waveguide cores from the center axis, giving preference to peripheral waveguide cores with greater fixed radial distances; and using the processing facility to compute a strain profile for the optical fiber from strain metrics evaluated, for each of the positions along the fiber, based on the optical signals associated with the central waveguide core and the selected peripheral waveguide cores.

13. The method of claim 12, wherein the at least three peripheral waveguide cores are selected by ranking the peripheral waveguide cores determined to be useful for strain measurements based on their respective radial distances in an order from longest radial distance to shortest radial distance, and selecting at least three of the highest-ranking waveguide cores.

14. The method of claim 12, wherein the peripheral waveguide cores comprise three inner waveguide cores placed at the first radial distance and three outer waveguide cores placed at the second radial distance, the second radial distance being greater than the first radial distance, and wherein the strain profile is computed from strain metrics evaluated based on the optical signals for the three outer waveguide cores at all positions along the fiber at which all three outer waveguide cores are useful for strain measurements and from strain metrics evaluated based on the optical signals for the three inner waveguide cores at all other positions along the fiber.

15. The method of claim 12, wherein the peripheral waveguide cores comprise inner waveguide cores placed at the first radial distance and outer waveguide cores placed at the second radial distance, the second radial distance being greater than the first radial distance, and wherein the outer waveguide cores are determined to be useful for strain measurements if predicted strains computed from the signals associated with the inner waveguide cores are below a specified strain threshold.

16. The method of claim 12, wherein the central and peripheral waveguide cores include fiber Bragg gratings, and wherein a waveguide core is determined to be useful for strain measurements at a given position along the optical fiber if a wavelength shift of a fiber Bragg grating at that position is below a specified wavelength shift threshold.

17. A non-transitory computer-readable medium storing instructions for controlling the operation of one or more hardware processors to compute a strain profile of a multi-core optical fiber from optical signals measured for a central waveguide core and at least four helically wound peripheral waveguide cores of the optical fiber, the peripheral waveguide cores being placed at fixed radial distances from the center axis, the instructions, when executed, causing the one or more hardware processors to:
determine, for each of a plurality of positions along the fiber, which of the peripheral waveguide cores are useful for strain measurements, and select, among the peripheral waveguide cores determined to be useful for strain measurements, at least three peripheral waveguide cores based on respective radial distances of the peripheral waveguide cores from the center axis, giving preference to peripheral waveguide cores with greater distances; and
compute the strain profile for the optical fiber from strain metrics evaluated, for each of the positions along the fiber, based on the signals measured for the central waveguide core and the selected peripheral waveguide cores.

18. The non-transitory computer-readable medium of claim 17, wherein the instructions cause the one or more hardware processors to select the at least three peripheral waveguide cores by ranking those peripheral waveguide cores among the at least four peripheral waveguide cores that are determined to be within range based on their respective radial distances in an order from longest radial distance to shortest radial distance, and selecting at least three of the highest-ranking waveguide cores.

19. The non-transitory computer-readable medium of claim 17, wherein the peripheral waveguide cores comprise three inner waveguide cores placed at a first radial distance and three outer waveguide cores placed at a second radial distance, the second radial distance being greater than the first radial distance, the instructions causing the one or more hardware processors to select, for evaluating the strain metrics, the three outer waveguide cores if the signals associated with the three outer waveguide cores are all within range, and otherwise the three inner waveguide cores.

20. The non-transitory computer-readable medium—of claim 17, wherein the peripheral waveguide cores comprise inner waveguide cores placed at a first radial distance and outer waveguide cores placed at a second radial distance, the second radial distance being greater than the first radial distance, the instructions for determining which of the peripheral waveguide cores are useful for strain measurements comprising instructions to compare respective predicted strains computed from the signals for the inner waveguide cores against a specified strain threshold.

* * * * *

UNITED STATES PATENT AND TRADEMARK OFFICE
CERTIFICATE OF CORRECTION

PATENT NO. : 10,823,627 B2
APPLICATION NO. : 16/342524
DATED : November 3, 2020
INVENTOR(S) : Sanborn et al.

Page 1 of 1

It is certified that error appears in the above-identified patent and that said Letters Patent is hereby corrected as shown below:

In the Claims

In Column 20, Line 36, in Claim 20, delete "medium-of" and insert --medium of-- therefor Signed and Sealed this
Twenty-ninth Day of December, 2020

Andrei Iancu
*Director of the United States Patent and Trademark Office*